United States Patent
Martens et al.

(10) Patent No.: US 7,345,973 B2
(45) Date of Patent: Mar. 18, 2008

(54) MULTI-LAYER WRITABLE OPTICAL RECORD CARRIER WITH AN OPTIMUM POWER CALIBRATION AREA, AND METHOD AND APPARATUS FOR FORMING OPTIMUM POWER CALIBRATION AREAS ON SUCH A RECORD CARRIER

(75) Inventors: Hubert Cécile François Martens, Eindhoven (NL); Wilhelmus Robert Koppers, Eindhoven (NL); Ronald Joseph Antonius Van Den Oetelaar, Eindhoven (NL); Pierre Hermanus Woerlee, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 239 days.

(21) Appl. No.: 10/561,471

(22) PCT Filed: Jun. 18, 2004

(86) PCT No.: PCT/IB2004/050936

§ 371 (c)(1),
(2), (4) Date: Dec. 20, 2005

(87) PCT Pub. No.: WO2004/114289

PCT Pub. Date: Dec. 29, 2004

(65) Prior Publication Data

US 2007/0104057 A1 May 10, 2007

(30) Foreign Application Priority Data

Jun. 26, 2003 (EP) .................................. 03101910

(51) Int. Cl.
*G11B 7/12* (2006.01)

(52) U.S. Cl. .................................. 369/47.53; 369/275.3
(58) Field of Classification Search ............. 369/47.53, 369/275.3
See application file for complete search history.

(56) References Cited

U.S. PATENT DOCUMENTS

| | | | | |
|---|---|---|---|---|
| 2002/0136122 A1* | 9/2002 | Nakano | ................... | 369/47.53 |
| 2003/0185121 A1* | 10/2003 | Narumi et al. | ........... | 369/47.53 |
| 2005/0232108 A1* | 10/2005 | Shoji et al. | ............. | 369/47.53 |
| 2006/0203648 A1* | 9/2006 | Lee et al. | ................ | 369/47.53 |

FOREIGN PATENT DOCUMENTS

EP 1 244 096 A2 9/2002

\* cited by examiner

*Primary Examiner*—Wayne Young
*Assistant Examiner*—LaTanya Bibbins
(74) *Attorney, Agent, or Firm*—Michael E. Belk

(57) ABSTRACT

A writable optical record carrier comprising a plurality of recording layers L0, . . . , Ln-1 separated by a spacer material, each recording layer comprising an optimum power calibration area having a first portion with an average reflection value representative of a recorded layer and a second portion with an average reflection value representative of an unrecorded layer, a method, and an apparatus for forming optimum power calibration areas on such a writable optical record carrier are presented. The optimum power calibration areas partially overlap such that the optimum power calibration areas of each pair of consecutive recording layers form a step, and the first portions of said plurality of recording layers have the form of a staircase. Each step formed by a pair of consecutive recording layers k, k+1 has a preferred minimum step size.

13 Claims, 3 Drawing Sheets

-ε  Rmin  +ε

MULTI-LAYER WRITABLE OPTICAL RECORD CARRIER WITH AN OPTIMUM POWER CALIBRATION AREA, AND METHOD AND APPARATUS FOR FORMING OPTIMUM POWER CALIBRATION AREAS ON SUCH A RECORD CARRIER

The present invention relates to a writable optical record carrier, and particularly to a recordable WORM- or RW-disc, comprising a plurality of recording layers separated by a spacer material, each recording layer comprising an optimum power calibration (OPC) area. It further relates to a method and an apparatus for forming optimum power calibration areas on such a writable optical record carrier.

The ever-increasing demand for data storage capacity has resulted in the development of high-density optical recording media such as write once or re-writable DVD discs and Blue-ray Disc (BD) discs. In these cases, data capacity has been increased by increasing the numerical aperture (NA) of the objective lens and by reducing the wavelength of the recording/reading laser light.

A complementary approach to obtain high storage capacities is to increase the number of recording layers. For example, by introducing n information storage layers, an n-fold increase in data capacity is obtained. This latter approach is currently followed for DVD+R, DVD+RW, BD-R, and BD-RW media Two-fold increase (in a dual-layer disc) is known, while four-fold increase (in a quadruple-layer disc) is being investigated.

There are two main different writing principles presently known: dye recording in the case of write once media such as CD-R, DVD+R and DVD-R, and phase-change recording in the case of rewritable media such as CD-RW, DVD-RAM, DVD-RW, DVD+RW, and BD-RW.

Phase-change recording layers commonly comprise a phase-change material that is typically an alloy with a durable polycrystalline structure sandwiched in a stack between two dielectric $ZnS$—$SiO_2$ layers. The energy of a writing laser beam, modulated by a recording signal, with which the record carrier is irradiated will to a large extent be absorbed by the phase change material, thereby inducing a phase change from a crystalline phase to an amorphous state. Whereas the crystalline phase (ground state) has a high reflectivity, the amorphous phase (written state) has a reduced reflectivity. Therefore, the recording layer reflects a reading beam focused on said recording stack with different intensities depending on whether it strikes a written area (mark) or an unwritten area (land).

Dye recording layers are typically composed of an organic dye layer comprising dye materials such as, for example, cyanine, phthalocyanine, or metallized azo, and a reflective metal layer, typically made of gold, silver, or aluminum. A writing laser beam will be partially absorbed by the recording layer, thereby durably and irreversibly bleaching and decomposing the dye material. A reading beam striking a mark written in that manner will be partially scattered by that mark. Consequently, the intensity of the light reflected at the reflective metal layer depends on whether the reading beam strikes a mark or passes the recording layer almost undisturbed.

In this way, the recording status of a layer induces a change in the average reflection of the layer and also affects its transmission. In the case of a multi-layer disc, this means that the reading and writing on one appointed (in-focus) layer generally is influenced by the presence of the other (out-of-focus) layers in the disc. Stray light generated at the out-of-focus layers is proportional to their average reflection within the NA of the objective lens, in turn depending on the presence of marks (representing data) in the out-of-focus layers in that region. Furthermore, the presence of data in the out-of-focus layers results in different transmission properties of those layers. Hence, when the laser beam passes one or more layers, the optical power that is received by the in-focus layer is altered, and different optimum conditions (that is, write power, focus offset, etc.) may be obtained depending on whether or not the surrounding layers contain data within the NA of the objective lens.

It is commonly known that, in order to obtain the best quality of the recorded data on an optical disc, the drive performs an optimum power calibration procedure (OPC) prior to the recording process. From this OPC-procedure, the drive determines the optimum power for recording the data. In general, this OPC procedure is performed whenever a disc (either blank or partially recorded) is inserted in the drive. For a multi-layer optical disc, the outcome of the OPC procedure for one layer may depend on the presence of data in the other layers.

In order to avoid a poor quality of the recorded data in multi-layer optical discs, these effects have to be accounted for. In European Patent Application 1244096, a disc having plural recording layers each with OPC-test areas is suggested. These OPC-test areas comprise portions with the highest power transmittance path and portions with the lowest power transmittance path. In such a disc, however, the space occupied by these OPC test areas is very large.

It is an object of the present invention to provide a writable optical disc with a plurality of recording layers, wherein optimum power calibration areas are provided which are efficient with respect to the calibration of the optimum writing power for the most preferred writing strategies, thereby requiring minimum space. It is a further object to provide a method and an apparatus for forming optimum power calibration areas on such a writable optical record carrier.

According to a first aspect of the present invention, this object is achieved by a writable optical disc for use in a recording device with an objective lens having an aperture NA, said disc comprising a plurality of recording layers $L0, \ldots, Ln-1$ separated by a spacer material each time, each of the recording layers comprising an optimum power calibration area, wherein at least the optimum power calibration areas of the layers $L0, \ldots, Ln-2$ or $L1, \ldots, Ln-1$ have a first portion with an average reflection value representative of a recorded layer, the optimum power calibration areas of each recording layer $L0, \ldots, Ln-1$ have a second portion with an average reflection value representative of an unrecorded layer, and said optimum power calibration areas partially overlap such that the first portions of each pair of consecutive recording layers $Lk, Lk+1$ form a step with a minimum step size $w_{k,k+1}$ of $$w_{k,k+1} = 2\varepsilon + \frac{NA}{\sqrt{n_m^2 - NA^2}} \cdot \Delta_{k,k+1}, \quad (1)$$

wherein $\varepsilon$ denotes the maximum radial misalignment of each recording layer, $\Delta_{k,k+1}$ denotes the thickness of the spacer material between the consecutive layers $Lk$ and $Lk+1$, and $n_m$ is the refractive index of the spacer material, and wherein the first portions of said plurality of recording layers have the form of a staircase.

The invention takes into account that in write-once multilayer media, preferably recording will be done layer-by-layer. This writing sequence may apply also in re-writable multi-layer discs. The most logical implementation for layer-by-layer recording is top-to-bottom or bottom-to-top. By defining staircase shaped portions, the effect of data in higher-lying layers and the absence of data in lower-lying layers, and vice versa, can be mimicked in the OPC-procedure. This has the advantage that the same situation, that is reflection and/or transmission from higher- and lower-lying layers, is encountered every time—both during OPC and during user data recording—during testing and recording of the consecutive layers, thereby occupying a minimum space on the disc.

The width of the steps in the staircase is chosen such that it ensures that during the OPC-procedure stray light from higher-lying layers with respect to an incident light beam always originates from portions representative of recorded areas, while stray light from lower-lying layers always comes from portions representative of unrecorded areas, or vice versa, depending on the preferred order in which the layers are to be recorded.

According to a second aspect of the present invention, which constitutes a further development of the first aspect, said optimum power calibration areas are arranged near the center of said disc, said first portions forming concentric circles.

According to a third aspect of the present invention, which constitutes a further development of the first aspect, said optimum power calibration areas are arranged near the periphery of said disc, said first portions forming concentric circles.

According to a fourth aspect of the present invention, which constitutes a further development of the second or third aspect, the radiuses of the concentric circles decrease from recording layer to recording layer, viewed in a direction away from the side of said disc on which the light beam is incident.

According to a fifth aspect of the present invention, which constitutes a further development of the second or third aspect, the radiuses of the concentric circles increase from recording layer to recording layer, viewed in a direction away from the side of said disc on which the light beam is incident.

Furthermore, according to a sixth aspect of the present invention, the above object of the invention is achieved by a method of forming optimum power calibration areas on a writable optical disc, said record disc comprising a plurality of recording layers L0, ..., Ln−1 separated by a spacer material each time, wherein marks are written on said recording layers by means of a recording device with an objective lens having an aperture NA, thereby forming an optimum power calibration area on each of the recording layers such that at least the optimum power calibration areas of the layers L0, ..., Ln−2 or L1, ..., Ln−1 have a first portion with an average reflection value representative of a recorded layer, the optimum power calibration areas of each recording layer L0, ..., Ln−1 have a second portion with an average reflection value representative of an unrecorded layer, and said optimum power calibration areas partially overlap such that the first portions of each pair of consecutive recording layers Lk, Lk+1 form a step with minimum step size of $$w_{k,k+1} = 2\varepsilon + \frac{NA}{\sqrt{n_m^2 - NA^2}} \cdot \Delta_{k,k+1},$$

wherein $\varepsilon$ denotes the maximum radial misalignment of each recording layer, $\Delta_{k,k+1}$, denotes the thickness of the spacer material between the consecutive layers Lk and Lk+1, and $n_m$ is the refractive index of the spacer material, and wherein the first portions of said plurality of recording layers have the form of a staircase.

According to a seventh aspect of the present invention, which constitutes a further development of the sixth aspect, said optimum power calibration areas are written near the center of said disc, said first portions forming concentric circles.

According to an eighth aspect of the present invention, which constitutes a further development of the sixth aspect, said optimum power calibration areas are written near the periphery of said disc, said first portions forming concentric circles.

According to an ninth aspect of the present invention, which constitutes a further development of the seventh or eighth aspect, the optimum power calibration areas are written such that the radiuses of the concentric circles decrease from recording layer to recording layer, viewed in a direction away from the light beam incidence side of said disc.

According to a tenth aspect of the present invention, which constitutes a further development of the seventh or eighth aspect, the optimum power calibration areas are written in such a way that the radiuses of the concentric circles increase from recording layer to recording layer, viewed in a direction away from the light beam incidence side of said disc.

Furthermore, according to an eleventh aspect of the present invention, the above object is achieved by an apparatus arranged for recording data on a writable optical disc, said disc comprising a plurality of recording layers L0, ..., Ln−1 having a maximum radial misalignment e and being separated by a spacer material having a thickness $\Delta_{k,k+1}$ between every two consecutive layers Lk, Lk+1 and a refractive index $n_m$, said apparatus comprising a writing unit with an objective lens having an aperture NA, said writing unit being arranged for writing marks on said recording layers, a control unit arranged for controlling said writing unit such that marks are written at predetermined positions of said recording layers, thereby forming an optimum power calibration area on each of the recording layers, wherein at least the optimum power calibration areas of the layers L0, ..., Ln−2 or L1, ..., Ln−1 have a first portion with an average reflection value representative of a recorded layer, the optimum power calibration areas of each recording layer L0, ..., Ln−1 have a second portion with an average reflection value representative of an unrecorded layer, and said optimum power calibration areas partially overlap such that the first portions of each pair of consecutive recording layers Lk, Lk+1 form a step with a minimum step size of $$w_{k,k+1} = 2\varepsilon + \frac{NA}{\sqrt{n_m^2 - NA^2}} \cdot \Delta_{k,k+1},$$

and wherein the first portions of said plurality of recording layers have the form of a staircase.

The information corresponding to the maximum radial misalignment $\epsilon$ of each recording layer, the thickness $\Delta_{k,k+1}$ of the spacer material between two consecutive layers Lk, Lk+1, and the refractive index $n_m$ of the spacer material may be stored on the record carrier itself. For example, it may be part of the information stored as a modulated wobble signal in the pre-groove of the disc in the case of a standard WORM or re-writable CD or DVD. Alternatively, the information may be stored as (pre-)recorded data in the lead-in-track or elsewhere on the disc.

In this case, according to a twelfth aspect of the present invention which constitutes a further development of the eleventh aspect, said apparatus further comprises means for deriving information from said writable optical disc corresponding to the maximum radial misalignment $\epsilon$ of each recording layer, the thickness $\Delta_{k,k+1}$ of the spacer material between two consecutive layers Lk, Lk+1, and the refractive index $n_m$ of the spacer material.

According to a thirteenth aspect of the present invention, which constitutes a further development of the eleventh aspect, said controlling unit is further arranged for storing information corresponding to the maximum number of tracks recorded in the second portion of any layer during an OPC-procedure and furthermore for writing marks on the other layers such that the same number of tracks are recorded in the second portions of the OPC areas of all layers.

The above and other objects, features and advantages of the present invention will become apparent from the following description of preferred embodiments thereof, taken in conjunction with the accompanying drawings in which FIG. 1 is a cross sectional schematic view of a multi-layer disc with staircase-shaped OPC-areas during an OPC operation;

Figure 1:
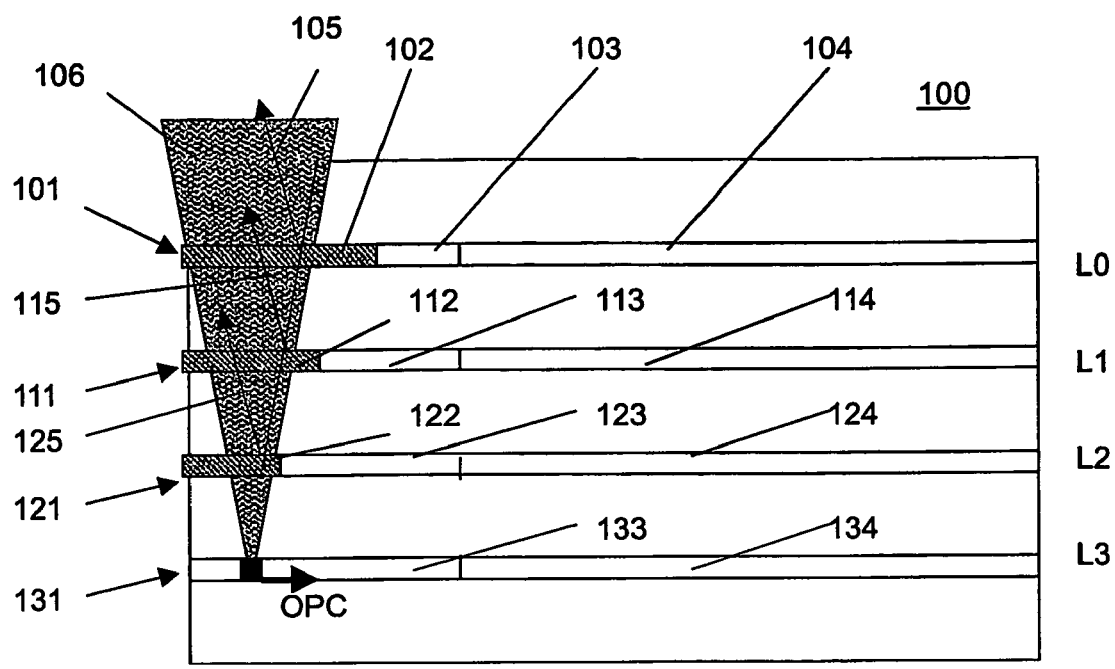

FIG. 1 shows a cross section of a first embodiment of a writable optical record carrier according to the present invention. The writable optical record carrier in this case is a multi-layer disc 100 comprising four recording layers L0 through L3, wherein L0 is the first or outermost layer and L3 the deepest layer with respect to an incident light beam. In other words, L0 defines the light beam incidence side of the disc. Each layer L0 to L3 comprises an OPC-area 101, 111, 121, and 131, respectively. Each of the OPC-areas except that of the deepest layer L3 has a first portion 102, 112, and 122, respectively, with an average reflection value representative of a recorded layer. Each of the OPC-areas except that of the first layer L0 has a second portion 113, 123, and 133, respectively, with an average reflection value representative of an unrecorded layer. Furthermore, each recording layer L0 to L3 comprises an unwritten data area 104, 114, 124, 134 for storing control data or user data. An OPC-test laser beam 106 is shown in FIG. 1 entering the disc from this incidence side. Arrows 105, 115, 125 indicate stray light being reflected at the first portions of the OPC-areas of the out-of-focus layers L0 to L2, while the beam 106 is focused on the deepest layer L3. In this case it is sufficient to provide only the layers L0, L1, L2 with first portions. Nevertheless, the layer L3 may also be provided with a first portion having an average reflection value representative of a recorded layer.

Figure 2:
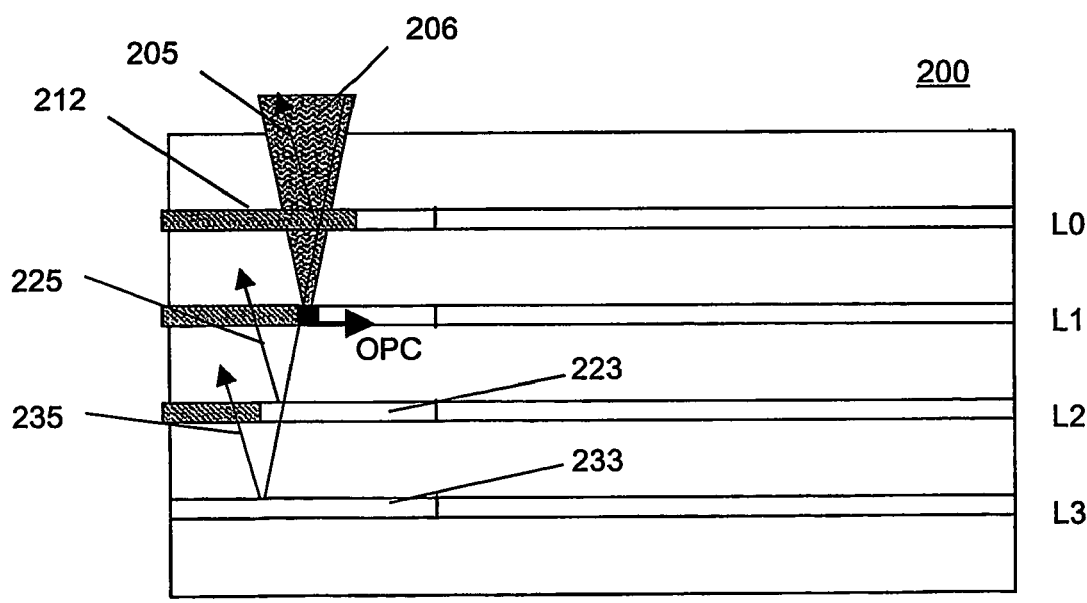
FIG. 2 is a cross sectional schematic view of a multi-layer disc with staircase-shaped OPC-areas during an OPC operation in a different state.

FIG. 2 shows the same embodiment of a 4-layer disc 200. The OPC-test laser beam 206 in this case is focused on the second layer L1 of the disc 200, while arrows 205, 225, 235 indicate the light being reflected at the out-of-focus layers L0, L2, and L3. More precisely, the light is reflected at the first (written) portion 212 of the OPC-area of L0 and at the second (unwritten) portions 223, 233 of the OPC-areas of L2 and L3, respectively.

It can be seen from both FIGS. 1 and 2 that the OPC-areas are arranged partially overlapping such that the first portions of the OPC-areas of each pair of consecutive recording layers form a step and that the OPC-areas of said plurality of recording layers have the form of a staircase. These areas are also referred to as staircase areas because of their shape.

The direction of the staircase areas is defined by the order of recording the layers (top-to-bottom or bottom-to-top). In the embodiment shown in FIGS. 1 and 2 the order of recording is top-to bottom (L0 to L3). If reverse order of recording (bottom-to-top) is preferred, it will be sufficient to provide layer L1, L2, L3 with first portions, only.

Usually, the OPC procedure is executed by a customary optical disc recorder before the actual recording process since it is not acceptable that, e.g. during real-time recording of a movie, a layer-jump requires a new OPC procedure to be performed, which would result in loss of part of the movie. Therefore, the OPC-areas should be present before the OPC procedure starts. They may be generated either by means of the recorder itself by writing suitable marks, e.g. when a "virgin" disc is mounted on the recorder the first time, or they may have been pre-recorded (ROM) on a ready-made disc. In the former case, a control unit may be provided in the recorder arranged for executing an OPC-area writing process before the OPC procedure starts if the recorder detects that no OPC-areas exist. Consequently, e.g. "dummy data" to be written by the writing unit may be stored in a table or memory of the recorder. The control unit may furthermore be arranged for controlling the writing unit to generate a writing beam modulated in accordance with the stored dummy data. Then, marks are written at predetermined positions on the layers (in the example shown in FIGS. 1 and 2, on the layers L0, L1, L2 only) of the disc, thereby forming a first portion of an optimum power calibration area on each of these layers having an average reflection value representative of a recorded layer.

It is to be noted that the data quality in the OPC-areas, both written by the recorder and pre-recorded, is not important, as long as it leads to an average reflection value representative of a recorded layer, e.g. 75% reflectivity of an unwritten initial-state layer and 25% reflectivity of a written (bleached or amorphous) area In the following we consider the OPC-areas near the inner radius $R_{min}$, (center) of the disc and for the case of top-to-bottom recording with respect to the laser incidence side of the disc. The invention also applies to bottom-to-top recording. Furthermore, the following argumentation can be extended to any other radius, preferably to OPC-areas near the outer radius $R_{max}$ (periphery) of the disc in a straightforward manner.

In order to make sure that the same situation (reflection/transmission by/through above and below layers) is encountered during OPC and during user data recording, the minimum step width is determined next. Two effects are considered: the misalignment or eccentricity of the layers and the apex angle of the light cone of the incident laser beam.

The incident reading or writing light beam is focused by an objective lens of the reading/writing unit of the recorder. This generates a light cone having an apex angle θ defined by the numerical aperture NA of the objective lens. It is $$NA = n_m \times \sin(\Theta), \quad (2)$$

wherein $n_m$ is the refractive index of the medium through which the light propagates, e.g. the spacer material which separates the recording layers.

On an out-of-focus layer that is located at distance Δ, a spot radius R of $$R = \Delta \times \frac{\sin^2(\Theta)}{\sqrt{1 - \sin^2(\Theta)}} \quad (3)$$
$$= \Delta \times \frac{NA}{\sqrt{n_m^2 - NA^2}}$$

is generated. The minimum width of the staircase areas is determined by this radius R in order to guarantee that the OPC-test beam always passes higher-lying layers having an average reflectivity representative of a recorded layer (top-to-bottom recording).

Figure 3:
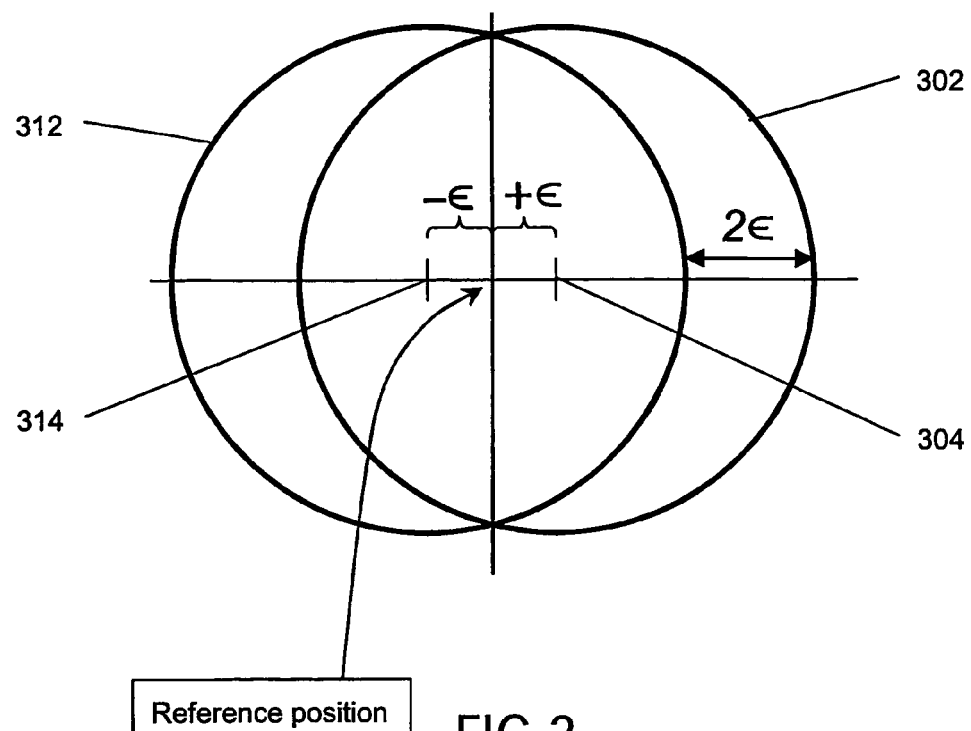
FIG. 3 is a schematic plan view of the maximum misalignment of two recording layers in a multi-layer disc.

So far, a possible misalignment of the layers has not been taken into account. The layers in a multi-layer disc should be aligned with respect to a reference point, e.g. the ideal geometrical center of gravity of the disc. The tolerance in positioning of the individual layers, in other words the eccentricity of the pre-groove-spiral of the layers, with respect to this reference point is ε. This implies that any pair of layers in the multi-layer disc is at most displaced by +2ε, or −2ε, with respect to each other, see FIG. 3. Inner radiuses $R_{min}$ 302 and 312 of the OPC-areas of two exemplary layers are shown. Their centres 304, 314 are displaced by +2ε (to the right) and −2ε (to left). To correct for a maximum possible misalignment or eccentricity, an additional increment of 2ε for the width of the staircase areas of consecutive layers is to be taken into account, as will be shown below.

Figure 4:
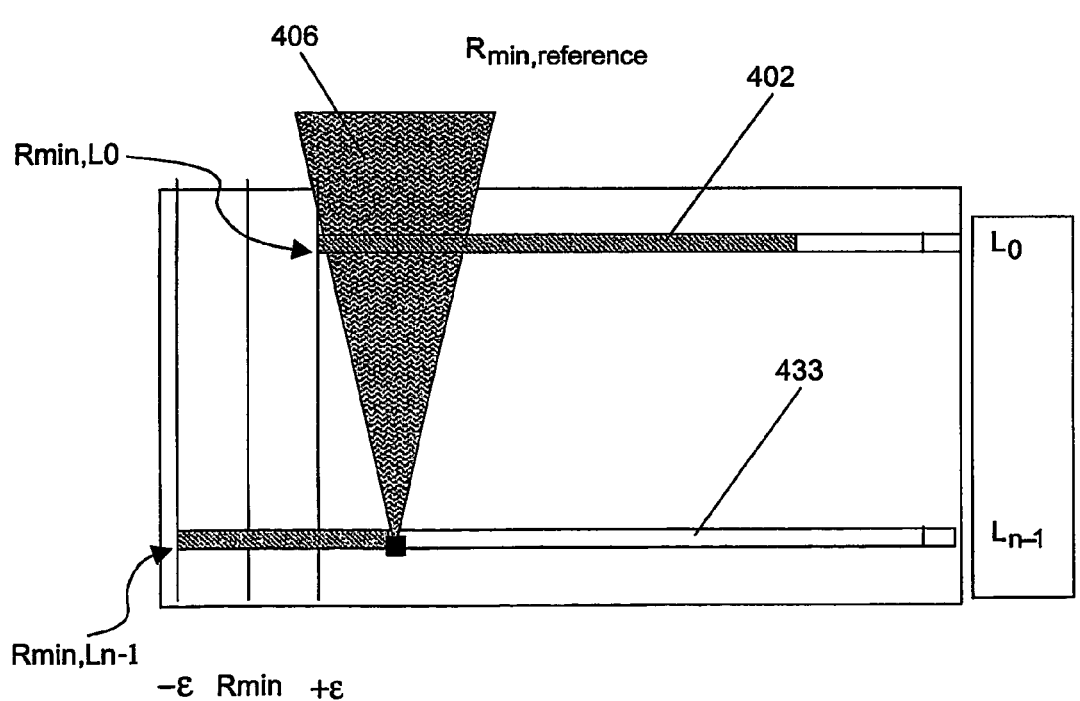
FIG. 4 is a cross-sectional cut-out of a multi-layer disc with n recording layers iustrating the first layer $L_0$ and last layer $L_{n-1}$.

The start position of the OPC area on the deepest layer Ln−1 of a n-fold layered disc is defined as $R_{OPC,Ln-1}$. When Ln−1 is in focus, the width of the spot $W_{Ln-1,L0}$ on the first layer L0 with respect to the incident light can be calculated from equation (3) given above. To ensure that the light cone 406 is fully captured by a written first portion 402 in L0 when performing OPC on the unwritten second portion 433 in Ln−1, the second portion of the OPC-area in Ln−1 should start at $$R_{min,Ln-1} + 2\varepsilon + \Delta_{tot} \times \frac{NA}{\sqrt{n_m^2 - NA^2}}, \quad (4)$$

where $\Delta_{tot}$ is the total vertical distance between Ln−1 and L0 (the summed thicknesses of all spacers), see FIG. 4.

Figure 5:
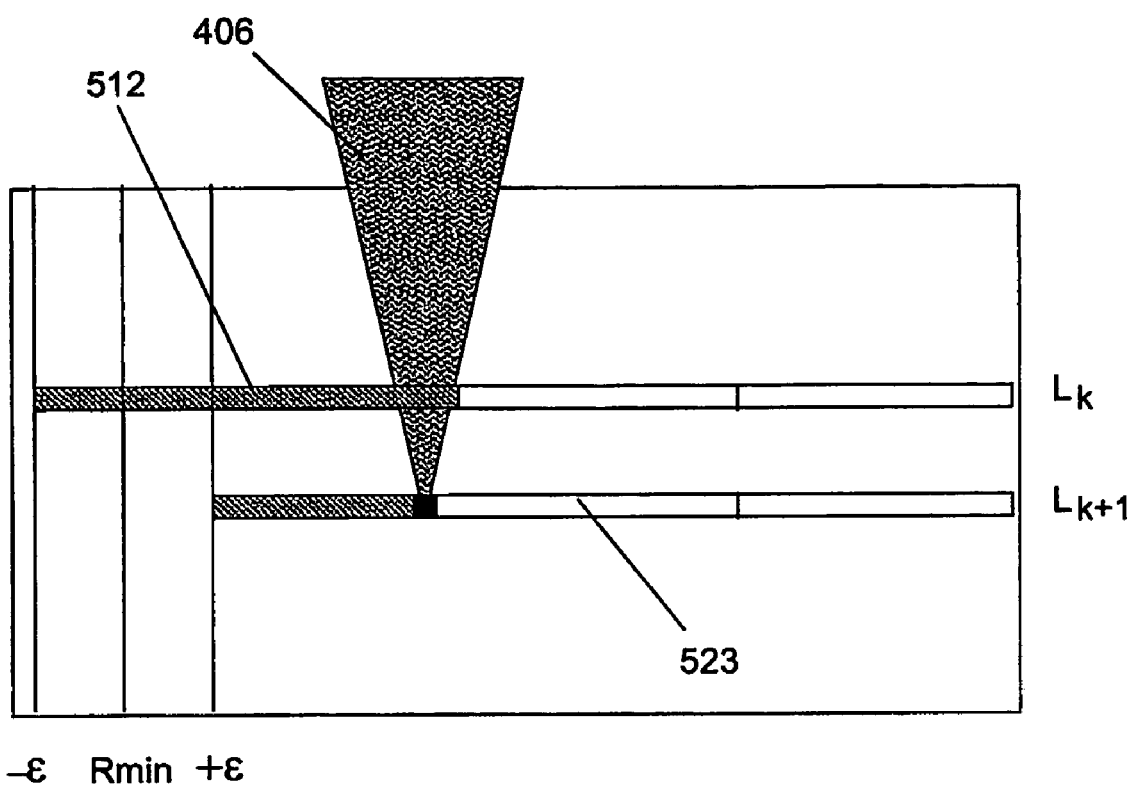
FIG. 5 is a cross-sectional cut-out of a multi-layer disc with n recording layers illustrating a pair of consecutive layers $L_i$ and $L_{i-1}$.

Furthermore, to ensure that the light cone 506 of a beam focused on a layer Lk+1 fully passes a recorded first portion 502 in the next higher layer Lk when performing OPC on the unwritten second portion 523 in Lk+1, the step size $w_{k,k+1}$ between the first portions of two consecutive layers Lk and Lk+1 should be $$w_{k,k+1} = 2\varepsilon + \frac{NA}{\sqrt{n_m^2 - NA^2}} \cdot \Delta_{k,k+1} \quad (5)$$

where $\Delta_{k,k+1}$ is the spacer thickness between consecutive layers, see FIG. 5. Note that $\Delta_{k,k+1}$ may vary between different layers.

These considerations imply that in an n-layer disc the following equation should be obeyed for the minimum width $w_i$ of the first portion of the OPC-area of each layer Li (i=0 . . . n−1):

$$w_i = 2\varepsilon + \frac{NA}{\sqrt{n_m^2 - NA^2}} \cdot \sum_{k=0}^{n-2} \Delta_{k,k+1} + \quad (6)$$
$$(1 - \delta_{i,n-1}) \cdot \sum_{k=i}^{n-2} \left[ 2\varepsilon + \frac{NA}{\sqrt{n_m^2 - NA^2}} \cdot \Delta_{k,k+1} \right]$$

Herein, $\Delta_{k,k+1}$ is the spacer thickness between the layers k+1 and k. Note that the first summation corresponds to the total spacer thickness $\Delta_{tot}$ between Ln−1 and L0, and that the last summation vanishes for i=n−1 due to the Kronecker delta-function $\delta_{i,n-1}$. Note that the deepest layer Ln−1 does not require a first portion having an average reflection value corresponding to a recorded layer since there is no deeper layer to be focused. Therefore, $w_{n-1}$ can also be set to 0. Furthermore, the first layer L0 does not require a second portion having an average reflection value corresponding to an unrecorded layer since the OPC-procedure, if necessary, may also be executed in the user data area of the first layer. Therefore, the maximum width of the OPC-area can be limited to $w_0$.

The number of tracks in the first portions of the OPC-areas that need to contain (dummy) data is obtained by dividing the step width by the track pitch.

The second portions of the OPC-areas, that is where the OPC-procedure takes place in a layer, are always defined adjacent to the first portions thereof. This ensures that for multiple OPC procedures on a single disc the requirements for data (no data) in the higher (lower) lying out-of-focus layers is met, particularly when each OPC on each layer uses the same number of tracks. The total length available for the OPC area may be set by other requirements.

When during an OPC-procedure new test data are written in the second portion of the OPC-area of any layer, the condition of the minimum step size may no longer be met. In a further embodiment of the invention, therefore, the apparatus for recording is arranged to (temporarily) store information corresponding to the maximum number of tracks (or data blocks) recorded on this layer during the OPC-procedure. Furthermore, it is arranged to record data or marks causing an average reflection value representative of a recorded layer on the other layers such that the same amount of tracks (data blocks) is recorded in the second portion of the OPC areas on all layers.

For example, in dual-layer DVD+R with NA=0.65, $n_m$ = 1.55, Δ=50 μm, 2ε=70 μm, and OPC-areas at the inner diameter of the disc according to equation (6), we obtain the following results: the first portion inner diameter of the second portion of the OPC area in L1 (deepest layer) starts at a width of $$w_1=70+0.46*50=93 \; \mu m=126 \text{ tracks}$$

counted from the start (inner diameter) of the L1 track at $R_{min,L1}$. For L0 (first layer), the width of the first portion of the OPC-area counts $$w_0=70+0.46*50+70+0.46*50=186 \text{ mm}=251 \text{ tracks}$$

from the start of the L0 track at $R_{min,L0}$. The second portion of the OPC area in L0 starts right behind $w_0$.

In quadruple-layer DVD+R with NA=0.65, $n_m$=1.55, $\Delta$=50 $\mu m$, $2\epsilon$=70 $\mu m$. Then, with OPC-areas at the inner diameter of the disc according to equation (6), we obtain the following results:

$$w_3=70+0.46*150+70+0.46*50=139 \text{ mm}=282 \text{ tracks,}$$

$$w_2=70+0.46*150+70+0.46*50+70+0.46*50=\\232 \text{ mm}=314 \text{ tracks,}$$

$$w_1=70+0.46*150+70+0.46*50+70+0.46*50+70+\\0.46*50=325 \text{ mm}=439 \text{ tracks}$$

and $$w_0=70+0.46*150+70+0.46*50+70+0.46*50+70+\\0.46*50+70+0.46*50=418 \text{ mm}=565 \text{ tracks.}$$

Each width $w_i$ counted from the start (inner diameter) of the corresponding track at $R_{min,Li}$.

The second portions of the OPC areas again start consecutive to their first portions.

In the same embodiments as above but for OPC-areas at the outer diameter of the disc, results with the same absolute values for $w_i$ are obtained but with negative signs. Consequently, each width $w_i$ is counted from the end (outer diameter) of the corresponding track at $R_{max,Li}$. In this case, the OPC should preferably be performed from the outer diameter towards inner diameter.

In an embodiment of the invention, the written effects in the staircase area contain control information.

It should be noted that this invention is not limited to an optical record carrier comprising 2 or 4 layers, but also applies a record carrier comprising 3, 5, and more layers. It is furthermore not limited to inner or outer diameter OPC-areas, but may apply to any other arrangement of OPC-areas as well.

The invention claimed is:

1. Writable optical disc for use in a recording device with an objective lens having an aperture NA comprising a plurality of recording layers L0, . . . , Ln−1 separated by a spacer material each time, each of the recording layers comprising an optimum power calibration area, wherein at least the optimum power calibration areas of the layers L0, . . . , Ln−2 or L1, . . . , Ln−1 have a first portion with an average reflection value representative of a recorded layer, the optimum power calibration areas of each recording layer L0, . . . , Ln−1 have a second portion with an average reflection value representative of an unrecorded layer, and said optimum power calibration areas partially overlap such that the first portions of each pair of consecutive recording layers Lk, Lk+1 form a step with a minimum step size $w_{k,k+1}$ of $$w_{k,k+1} = 2\varepsilon + \frac{NA}{\sqrt{n_m^2 - NA^2}} \cdot \Delta_{k,k+1},$$

wherein $\epsilon$ denotes the maximum radial misalignment of each recording layer, $\Delta_{k,k+1}$ denotes the thickness of the spacer material between the consecutive layers Lk and Lk+1, and $n_m$ is the refractive index of the spacer material, and wherein the first portions of said plurality of recording layers have the form of a staircase.

2. Writable optical disc according to claim 1, characterized in that said optimum power calibration areas are arranged near the center of said disc, said first portions forming concentric circles.

3. Writable optical disc according to claim 1, characterized in that said optimum power calibration areas are arranged near the periphery of said disc, said first portions forming concentric circles.

4. Writable optical disc according to claim 2 or 3, characterized in that the radiuses of the concentric circles decrease from recording layer to recording layer, viewed in a direction away from the light beam incidence side of said disc.

5. Writable optical disc according to claim 2 or 3, characterized in that the radiuses of the concentric circles increase from recording layer to recording layer, viewed in a direction away from the light beam incidence side of said disc.

6. Method of forming optimum power calibration areas on a writable optical disc, said disc comprising a plurality of recording layers L0, . . . , Ln−1 separated by a spacer material, wherein marks are written on said recording layers by means of a writing recording device with an objective lens having an aperture NA, thereby forming an optimum power calibration area on each of the recording layers such that at least the optimum power calibration areas of the layers L0, . . . , Ln−2 or L1, . . . , Ln−1 have a first portion with an average reflection value representative of a recorded layer, the optimum power calibration areas of each recording layer L0, . . . , Ln−1 have a second portion with an average reflection value representative of an unrecorded layer, and said optimum power calibration areas partially overlap such that the first portions of each pair of consecutive recording layers Lk, Lk+1 form a step with minimum step size of $$w_{k,k+1} = 2\varepsilon + \frac{NA}{\sqrt{n_m^2 - NA^2}} \cdot \Delta_{k,k+1},$$

wherein $\epsilon$ denotes the maximum radial misalignment of each recording layer, $\Delta_{k,k+1}$ denotes the thickness of the spacer material between the consecutive layers Lk and Lk+1, and $n_m$ is the refractive index of the spacer material, and wherein the first portions of said plurality of recording layers have the form of a staircase.

7. Method according to claim 6, characterized in that said optimum power calibration areas are written near the center of said disc, said first portions forming concentric circles.

8. Method according to claim 6, characterized in that said optimum power calibration areas are written near the periphery of said disc, said first portions forming concentric circles.

9. Method according to claim 7 or 8,
characterized in that said optimum power calibration areas are written such that the radiuses of the concentric circles decrease from recording layer to recording layer, viewed in a direction away from the light beam incidence side of said disc.

10. Method according to claim 7 or 8,
characterized in that said optimum power calibration areas are written such that the radiuses of the concentric circles increase from recording layer to recording layer, viewed in a direction away from the light beam incidence side of said disc.

11. Apparatus arranged for recording data on a writable optical disc, said disc comprising a plurality of recording layers L0, ..., Ln−1 having a maximum radial misalignment $\epsilon$ and being separated by a spacer material having a thickness $\Delta_{k,k+1}$ between every two consecutive layers Lk, Lk+1 and a refractive index $n_m$, said apparatus comprising
   a writing unit with an objective lens having an aperture NA, said writing unit being arranged for writing marks on said recording layers,
   a control unit arranged for controlling said writing unit such that marks are written at predetermined positions of said recording layers, thereby forming an optimum power calibration area on each of the recording layers, wherein at least the optimum power calibration areas of the layers L0, ..., Ln−2 or L1, ..., Ln−1 have a first portion with an average reflection value representative of a recorded layer, the optimum power calibration areas of each recording layer L0, ..., Ln−1 have a second portion with an average reflection value representative of an unrecorded layer, and said optimum power calibration areas partially overlap such that the first portions of each pair of consecutive recording layers Lk, Lk+1 form a step with a minimum step size of $$w_{k,k+1} = 2\varepsilon + \frac{NA}{\sqrt{n_m^2 - NA^2}} \cdot \Delta_{k,k+1},$$

and wherein the first portions of said plurality of recording layers have the form of a staircase.

12. Apparatus according to claim 11, characterized in that said apparatus further comprises
   means for deriving information from said writable optical disc corresponding to the maximum radial misalignment $\epsilon$ of each recording layer, the thickness $\Delta_{k,k+1}$ of the spacer material between two consecutive layers Lk, Lk+1, and the refractive index $n_m$ of the spacer material.

13. Apparatus according to claim 11,
characterized in that said control unit is further arranged for storing information corresponding to the maximum number of tracks recorded in the second portion of any layer during an OPC-procedure and furthermore for writing marks on the other layers such that the same number of tracks are recorded in the second portions of the OPC areas of all layers.

* * * * *